Nov. 5, 1963      R. TORRESEN      3,109,650
PIN DETECTING AND INDICATING SYSTEM
Filed Dec. 9, 1960      3 Sheets-Sheet 1

Inventor
Robert Torresen
By Hofgren, Brady,
Wegner, Allen & Stellman
Attorneys

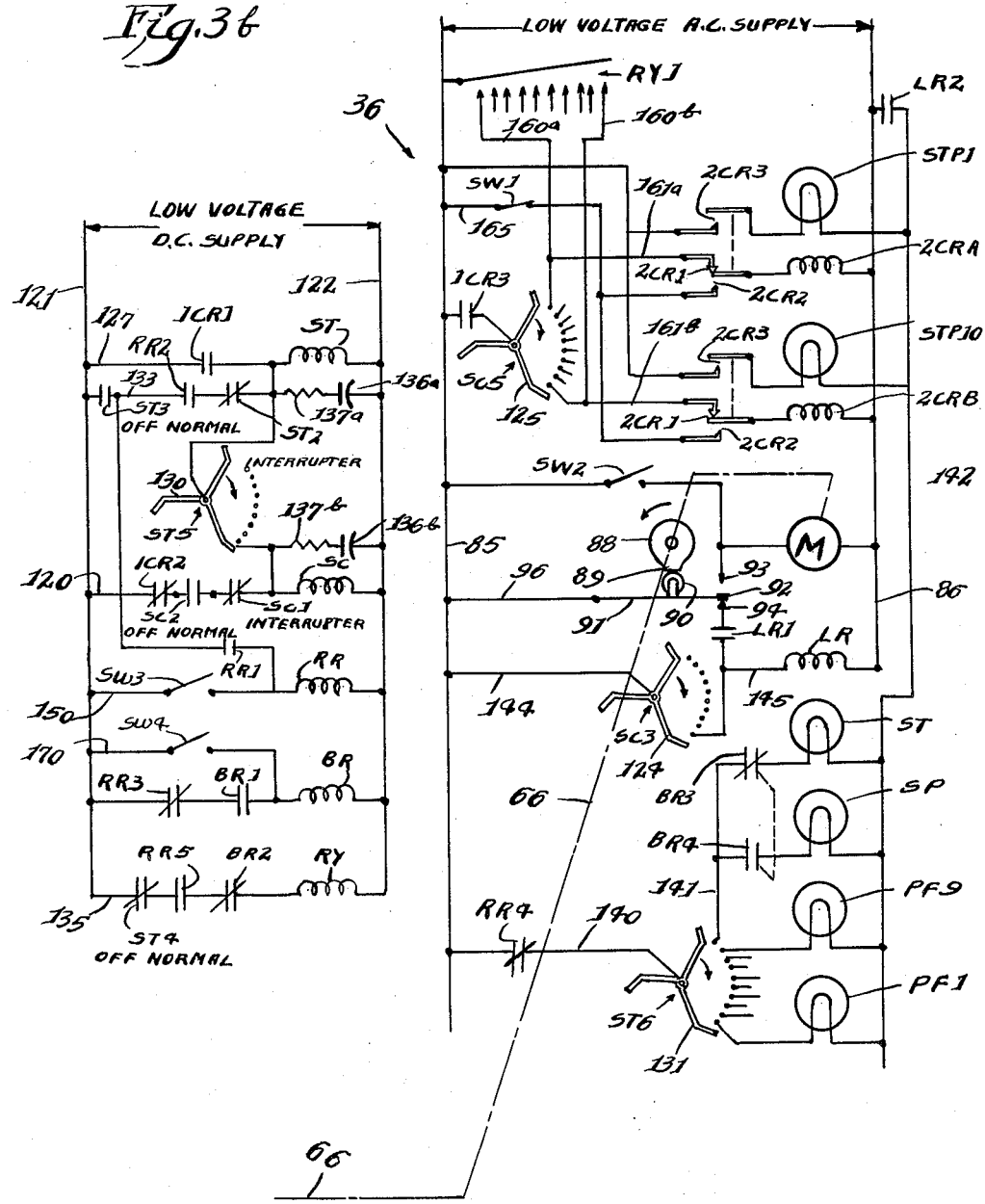

United States Patent Office 3,109,650
Patented Nov. 5, 1963

3,109,650
PIN DETECTING AND INDICATING SYSTEM
Robert Torresen, Muskegon, Mich., assignor, by mesne assignments, to Brunswick Corporation, Chicago, Ill., a corporation of Delaware
Filed Dec. 9, 1960, Ser. No. 75,008
30 Claims. (Cl. 273—52)

This invention relates to bowling, and more particularly to detection of pins standing or pins down after a ball has been thrown, for the purpose of giving to the bowler, to a scorer, or to spectators a visual indication of the results of the ball thrown, and constitutes an improvement over the apparatus disclosed in my pending application Serial No. 802,152, filed March 26, 1959, now Patent No. 3,011,785, granted December 5, 1961.

It is a general object of the invention to provide a new and improved pin detection apparatus of the type described.

In the apparatus disclosed in my prior application, separate pin detection means are provided at each of the pin spots on the alley, and these detection means are scanned individually in sequence to provide signals corresponding to standing pins for operating an indicating means. In situations where the pin detecting apparatus is used in connection with automatic pinsetters, which is the most common application, detection of standing pins must take place after a ball has been rolled and before the pinsetter picks up pins for respotting or before the rake sweeps the alley clean. Thus, only a limited time is available for pin detection, and during this time there may be one or more pins which have been struck in such a way that they are not knocked down but instead rock back and forth for some time. In a system where the pin detection means at the several pin spots are scanned only once, as in my prior application, it may be possible to scan one or more pin detection means at a time when the pin or pins thereover may not have fallen but may be wobbling so that a pin is tilted to such an extent that a large air gap is introduced between the bottom of the pin and pin detection means in the alley and the pin is therefore not detected.

According to the present invention, provision is made for scanning the pin detection means at the various pin spots repeatedly in a predetermined period of time at a frequency calculated to detect all pins left standing even though one or more may be wobbling at the time. The number of scanning cycles is dependent on the period of oscillation of the pins and the time available for scanning. In the system described herein, the pin spots are scanned five times, but this can be varied.

The pin detecting signals are stored in memory circuits until scanning of the pin spots has been completed, whereupon the memory circuits are scanned to operate an indicating means. Such memory circuits are designed to operate on signals varying greatly in magnitude and yet supply signals of nearly uniform strength to the indication means.

With the above and other considerations in mind, it is a more specific object of the present invention to provide a new and improved pin detection system including means for scanning pin detection means at the various pin spots individually in sequence and storing the signals corresponding to standing pins.

Another object is to provide a new and improved pin detection apparatus of the type described including means for scanning the pin detection means at various pin spots repeatedly within a predetermined period of time and storing the signals corresponding to standing pins.

A further object is to provide a new and improved pin detection apparatus of the character mentioned, including a plurality of memory circuits associated respectively with the pin detection means at the various pin spots responsive to signals from the pin detection means at which pins are standing for storing charges corresponding to standing pins, and means for scanning the memory circuits to operate an indicating means for signalling pinfall results.

Another object is to provide a new and improved pin detection and indication system including a plurality of pin detection circuits corresponding to pin spots on the alley for sensing standing pins and storing signals corresponding to standing pins, together with indicating means operable by the stored signals for indicating pinfall results.

Other objects and advantages will become readily apparent from the following detailed description taken in connection with the accompanying drawings in which:

FIGS. 3a and 3b illustrate diagrammatically an electromechanical apparatus according to the present invention, including detecting and indicating circuitry, these figures being readable when placed side by side with FIG. 3a on the left.

Figure 1:
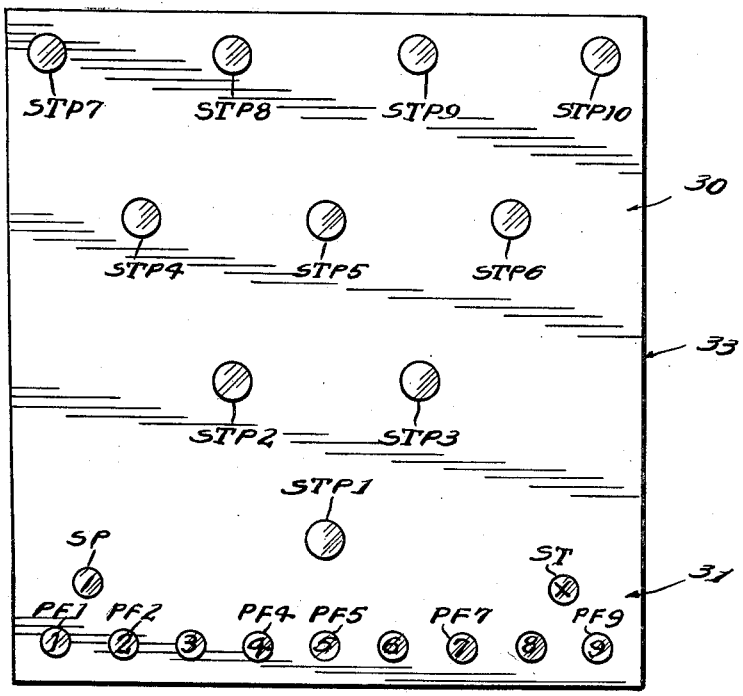
FIG. 1 is a diagrammatic illustration of an indicating panel including signal lamps for indicating the positions of standing pins after a ball has been thrown and for indicating the number of pins down after a ball has been thrown, including strike and spare signals.

While an illustrative embodiment of the invention is shown in the drawings and will be described in detail herein, the invention is susceptible of embodiment in many different forms, and it should be understood that the present disclosure is to be considered as an exemplification of the principles of the invention and is not intended to limit the invention to the embodiment illustrated. The scope of the invention will be pointed out in the appended claims.

Figure 2:
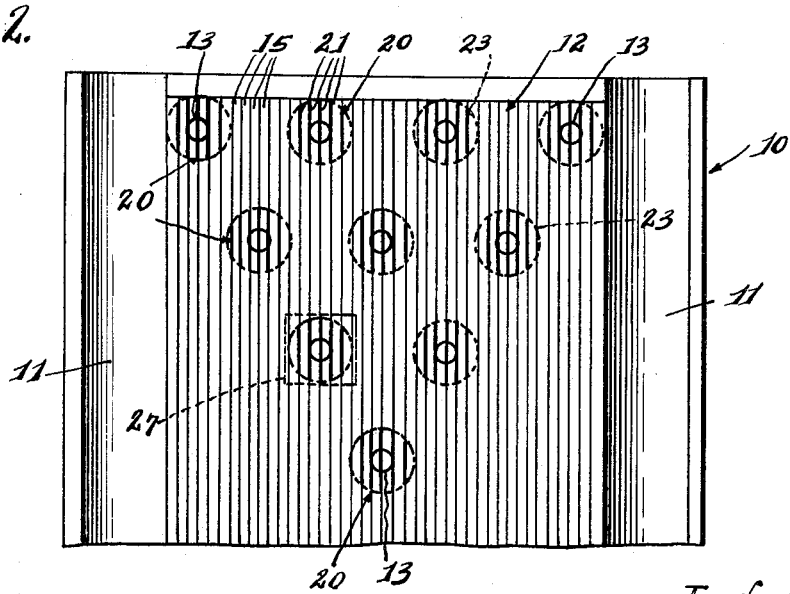
FIG. 2 is a plan view of a bowling alley having pin detecting means at the various pin spots.

Referring now to the drawings in more detail, FIG. 2 illustrates in plan view an end portion of a typical bowling alley 10 including gutters as at 11 and a bed 12 having ten triangularly arranged pin spots as at 13 in a conventional fashion. Normally, the alley is comprised of a plurality of laminated side by side strips as at 15 of electrically non-conductive material, usually wood, which are suitably secured together and provide a planar horizontal surface for supporting standing pins.

A pin detecting means is provided in the alley as described in my prior application for detecting pins either on spot or off spot within a predetermined vicinity immediately surrounding the spots, usually a range corresponding to that of pinsetter pickup devices. Each pin detecting means is identified generally by the reference number 20 and includes a plurality of thin electrically conductive plates 21, such as metal foil embedded in the alley as by insertion between the wood or other strips 15 comprising the laminae of the bed. The plates are spaced a distance approximately equal the radius of a bowling pin base, preferably not exceeding the radius of the base, so that a standing pin having a conductive base portion may easily bridge at least two of the plates. As shown most clearly in FIG. 2, the plates are arranged to cover a circular area indicated by the broken line circles 23. Preferably, the circle has a diameter equal about three times the diameter of a pin base so that a pin may move completely off spot in any direction and its presence will still be detected.

Figure 3A:
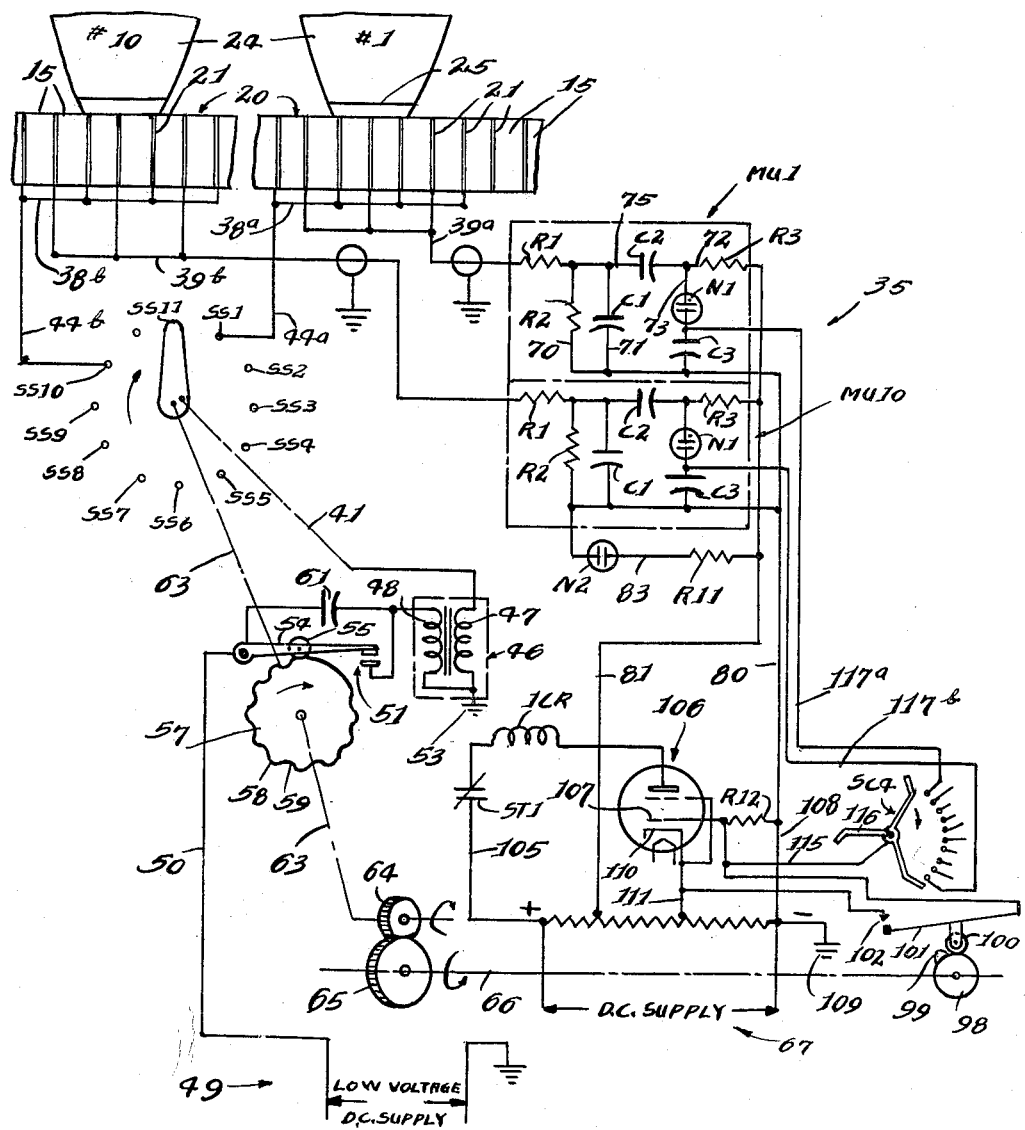

As shown best in FIG. 3a, the metal plates or strips are disposed on edge and have their upper edges substantially flush with the top surface of the alley to be substantially engaged by the conductive base portion of a pin standing in the area. Modern day pin construction frequently comprises a bowling pin having a main body portion as at 24 with an attached plastic insert ring at the base as at 25 for assuming the brunt of wear and impact in use. Such plastic inserts may include metallic powder or particles sufficient to render the insert conductive for the purposes of the present invention without substantially altering the quality or physical characteristics of the pin as a whole. Alternatively, a thin metal ring may be molded on the inside of the plastic ring or otherwise located in the pin base with its bottom edge flush with the bottom surface of the pin. While a preferred relative size and shape of the pin detecting area has been illustrated in FIG. 2, it will be understood that the size and shape of the area may readily be altered to conform to the desires and necessities of the particular installation. For example, the pin detecting area may cover a square or rectangular portion of the alley at each pin spot as illustrated by the broken line box 27 in FIG. 2.

According to the present invention, the detecting means shown and described is utilized to indicate the results of each ball thrown. The indicating or signalling means for apprising the bowler of the results takes the form of a first indicating means generally designated 30 (FIG. 1) for showing the positions of standing pins remaining after a ball has been thrown and a second indicating means generally designated 31 for indicating the number of pins down after each ball has been thrown, including an indication of strikes and spares.

The standing pin indicator 30 includes a triangular arrangement of ten signal lamps designated STP1 through STP10 corresponding to the positions of pin spots 13 on the alley. These lamps may be suitably arranged in an upright indicating panel 33 of a suitable nature and are included in a circuit arrangement shown in FIGS. 3a and 3b.

The pinfall indication means 31 includes 11 signal lamps which may be suitably arranged in the panel means 33 and which are a strike lamp ST, a spare lamp SP and nine pinfall lamps PF1 through PF9, each of these lamps also being connected in an electric circuit arrangement illustrated in FIGS. 3a and 3b.

Referring to FIGS. 3a and 3b, the circuitry illustrated includes a pin detecting and signal storage portion 35 (FIG. 3a) and an indicating portion 36 (FIG. 3b). The detecting circuitry, of course, includes the ten individual pin detecting means 20, though for purposes of simplification, only two of the individual detecting means are illustrated, as these will enable an understanding of the invention. The indicating circuitry includes the ten standing pin lamps STP1 through STP10, though only two of these, STP1 and STP10, have been illustrated. Strike lamp ST, spare lamp SP, and pinfall lamps PF1 through PF9 are included in the indicating circuit but several of the pinfall lamps have been omitted in order to simplify the drawing.

Referring to the individual pin detecting means 20 as illustrated in elevation in FIG. 3a, each of these includes a plurality of individual plates 21, approximately seven. Alternate ones of the plates 21 are connected in parallel with each other and to a common wire as at 38a and 38b so that these may be connected to one side of a circuit. The remaining, intervening plates 21 are in parallel with each other and these are connected to a wire as at 39a and 39b which may be described as the other side of the circuit. Thus, the two groups of plates 21 in effect constitute two switch contacts adapted to be bridged by the conductive base portion of a standing pin.

The several switches corresponding to the ten pin spots are connected in series with a scanning switch SS in turn connected with a source of electrical energy so that as the scanning switch is operated a signal will be produced through each of the pin spots on which a pin is standing. The signals produced are utilized for operating the indicating means.

The scanning switch SS comprises stationary switch contacts SS1 through SS10, and a rotary scanning switch contact SS11 having a normal "home" position as illustrated at which there is no stationary switch contact, the rotary contact being movable in a clockwise direction to successively register with the stationary contacts. Because of the high potential pulse as will be explained, actual contact between the rotary contact and the stationary contacts is not necessary. The rotary switch contact is connected to a source of electrical power by a wire as at 41, and the stationary switch contacts are connected through the ten pin spots respectively as by wires 44a and 44b which connect to the wires 38a and 38b respectively. The wires 39a and 39b leading from the several pin spots are connected respectively to memory units MU as will be explained.

In alley constructions usually consisting of wood, the surface of the alley is commonly covered with hard finishes, alley dressings, dust and the like, and indentations frequently develop in the alley surface due to ball and pin impacts. For this reason, it will be understood that it may be rather difficult to maintain at all times an actual engagement between the plates 21 and a pin base 25. Accordingly, a relatively high voltage is provided at the pin detecting switches in the alley to insure that a signal will be transmitted through the switch when a pin is standing, regardless of imperfections. Preferably in order to obtain the necessary signals without creating a dangerous condition, the circuit provides high potential pulses of short duration such that the total energy is limited to an amount incapable of causing a fire or shock hazard.

The high potential low energy pulses are provided by an inductor 46 having a secondary 47 connected to the wire 41 in circuit with the rotary scanning switch contact and having a primary 48 connected in circuit with a suitable D.C. power supply as at 49. The power supply is connected to the primary by a wire 50 and the inductor is grounded as at 53. In operation, a switch 51 in wire 50 includes a movable contact on a pivoted arm 54 having a roller 55 engageable with the periphery of a rotary cam 57 having an undulated peripheral surface consisting of alternate rises and falls including high portions 58 and low portions 59. When the roller 55 engages the low portions 59, the switch 51 is closed and the coil 48 energized. When the highs 58 engage the roller 55, the switch 51 is opened, braking the circuit to the primary 48. When the circuit to the primary is interrupted, the interruption takes place with extreme suddenness due to the provision of a capacitor 61 in parallel around the switch 51 which suppresses the arc when the switch contacts open. Due to the resulting sudden decay of flux, a relatively high potential is induced in the secondary coil 47.

In an actual installation, the rotary scanning switch contact SS11 and the rotary cam 57 are driven from a common source, and preferably both are mounted on the same shaft illustrated diagrammatically at 63 so that the two operate in timed relationship such that the scanning switch contacts are successively closed as the high potential pulse is generated in the inductor 46. The shaft 63 is preferably driven through five revolutions for each detecting cycle in order to repeatedly scan the pin spots in order to be certain of detecting standing pins even though some may be wobbling. As illustrated, the shaft 63 is driven by a gear 64 thereon in turn driven by a gear 65 on a shaft 66 driven by a motor M. As will appear, the gears 64 and 65 have a five to one ratio so that the shaft 63 is driven five revolutions and the shaft 66 is driven one revolution during a pin detection cycle.

Wires 39a and 39b leading respectively from the pin detection means are connected respectively to signal storage units or memory units designated MU1 and MU10, each consisting of a voltage divider and pulse shaper circuit as well as a memory circuit. Each voltage divider and pulse shaper circuit consists of a resistor R1 connected with the corresponding wire 39, a resistor R2 in a wire 70, and a capacitor C1 in a wire 71. Each memory circuit consists of a resistor R3 in a wire 72, a neon lamp N1 in a wire 73, and a capacitor C3 connected in series with the neon lamp in wire 73. An isolating capacitor C2 is provided in a wire 75 between the wire 71 and the wire 73. Thus, pulses generated by the inductor 46 and passing through standing pins are utilized in the memory units corresponding respectively to the pin spots.

In operation, if a pin is standing on any spot, the pulse passed thereby is fed to the voltage divider and reduced to an operable value. The reduced pulse is then passed through the isolating capacitor C2 to the memory circuit. A D.C. potential less than the starting voltage but higher than the operating voltage of the neon lamp is maintained across the memory circuit by means of a wire 80 connected with the capacitor C3 and a wire 81 connected with the resistor R3, the wires 80 and 81 being connected to a D.C. supply 67. The signal passed through the capacitor C2 causes the neon lamp to start, and pass current, charging the capacitor C3. As the voltage across C3 increases, the voltage across the neon lamp reduces until its magnitude is less than the lamp's maintaining voltage. Thereupon, current flow ceases, extinguishing the lamp and leaving a charge on the capacitor C3. If there is no pin standing on a pin spot, no pulse is applied to the neon lamp, or the pulse applied is too small to start the lamp, and the storage capacitor is not charged. Thus, the presence or absence of a charge on a capacitor C3 indicates the presence or absence of a standing pin on the corresponding pin spot.

A neon lamp N2 in a wire 83 is maintained lighted and is mounted so as to illuminate the memory unit neon lamps N1 in order to eliminate the dark effect characteristic of neon lamps. A ballast resistor R11 is connected in series with the lamp N2 in wire 83.

The motor M is connected across wires 85 and 86 representing a low voltage A.C. supply, and in circuit with the motor is a normally open switch SW2 for initiating the pin detection and indication cycle. A pin detection and indication system of the type described herein may be operated in connection with an automatic pinsetter either by the pinsetter or in timed relationship with the pinsetter, or it may be operated independently of the pinsetter. In an automatic pinsetter, means is normally provided for initiating pinsetter cycling upon the rolling of a ball. Similar means may be provided for initiating pin detection and indication, or the pinsetter may be relied upon for operation of the switch SW2. In the latter case, shortly after pinsetter operation is initiated, say for example, at 40° in a 360° cycle, the switch SW2 is closed, energizing the motor M.

The motor drives the shaft 66 and a cam 88 on the shaft. The cam 88 includes a lobe 89 engageable with a roller 90 on a switch arm 91 to maintain switch contact 92 separated from switch contact 93 and engaged with switch contact 94 when the motor is deenergized. When the motor is energized, the cam rotates in a counter-clockwise direction, releasing the roller 90 and allowing the contacts 92 and 93 to close, providing a holding circuit for the motor through wire 96, while the contacts 92 and 94 open. The cam 88 completes one revolution, whereupon the lobe 89 again engages the roller 90, opening the contacts 92 and 93 to de-energize the motor M, the switch SW2 having opened again.

During the single revolution of cam 88, the gear 65 is driven through a complete revolution, driving the gear 64 and the shaft 63 through five revolutions, thereby rotating the cam 59 and the switch arm SS11 five times each. During rotation of the cam 59 and the switch arm SS11, the pin detecting means at the various pin spots are scanned individually in succession and repeatedly, storing charges in the memory circuits corresponding to standing pins.

Near the end of the single revolution of the shaft 66, a cam 98 on this shaft brings its lobe 99 into contact with a roller 100 on a switch arm 101 to momentarily close switch contacts 102. As will appear, closure of the contacts 102 initiates scanning of the memory circuits to operate the indicating means in the manner dictated by charges stored in the capacitors C–3.

Operation of the indicating portion of the circuit is controlled by a relay 1CR connected by a wire 105 to the positive side of D.C. supply 67 and connected to the plate circuit of a thyratron tube 106. Grid 107 of the tube 106 is connected through a resistor R12 and a wire 108 to the negative side of D.C. supply 67 which is grounded as at 109. Cathode 110 is returned to a tap 111 on a voltage divider across the D.C. supply 67 so as to maintain the cathode at a positive potential with respect to the grid 107. Grid 107 is also connected by a wire 115 to a wiper 116 in a scanning switch SC4 having stationary contacts connected respectively as by wires 117a and 117b to the capacitors C3 in the memory circuits.

In operation, when the cam lobe 99 closes the switch 102, this shorts the grid 107 and the cathode 110, removing the bias from the grid and causing the thyratron to trigger. Current then flows through the tube, energizing the relay 1CR. As will appear, this initiates stepping of the wiper 116 to scan the memory circuits, and when the wiper 116 contacts a stationary terminal connected to a charged capacitor C3, the charge is applied to the grid 107 of the thyratron tube, triggering the tube to energize the relay coil 1CR once again for each charged capacitor C3, or in other words, once again for each standing pin.

The scanning switch SC4 is part of a stepping relay controlled by a coil SC (FIG. 3b) in a wire 120 connected across wires 121 and 122 representing a low voltage D.C. supply. The coil SC also controls a stepping switch SC3 including a wiper 124 which is stepped once on each de-energization of the coil SC, and a stepping switch SC5 including a wiper 125 which is stepped once for each de-energization of the coil SC. The coil SC also controls one normally closed set of interrupter contacts SC1 in wire 120 which are opened shortly after each energization of the coil SC and which close on de-energization of the coil. The coil SC also controls a pair of normally open "off-normal" switch contacts SC2 which are closed when the wipers 116, 124 and 125 are stepped one step from the "home" position illustrated and remain closed until the wipers return to "home" position.

The circuit also includes a relay controlled by a coil ST in a wire 127 connected across the wires 121 and 122. This relay controls a stepping switch ST5 including a wiper 130 and a stepping switch ST6 including a wiper 131, the wipers being advanced one step on each de-energization of the coil ST. The coil ST also controls normally closed interrupter contacts ST1 in circuit with the control relay 1CR and ST2 in a wire 133. Coil ST also controls normally open "off-normal" contacts ST3 in wire 133 and normally closed "off-normal" contacts ST4 in a wire 135.

The coils ST and SC are each shunted by a capacitor as at 136a and 136b and a resistor as at 137a and 137b connected in series to suppress arcing of the interrupter contacts. A high capacitance capacitor is used in connection with the coil SC in order to cause this relay to step at a lower rate than that controlled by the coil ST.

Returning now to the operation, when cam lobe 99 closes the switch 102, the thyratron 106 is triggered, energizing the coil 1CR. This closes normally open contacts 1CR1 in wire 127 and normally open contacts 1CR3 in circuit with wiper 125, and opens normally closed contacts 1CR2 in wire 120. When the contacts 1CR1 close, the coil ST is energized and at the same time coil SC is energized through the wiper 130. As the armature associated with the coil ST nears the end of its stroke, the normally closed interrupter contacts ST1 in wire 105 are opened, interrupting the circuit through the tube 106, de-energizing the coil 1CR and restoring control of the tube 106 to the grid 107. Contacts 1CR1 open again, de-energizing the coil ST, whereupon each of the wipers 130 and 131 is advanced one step and the "off-normal" contacts ST3 are closed. Advance of the wiper 130 opens the circuit to the coil SC, de-energizing this coil, whereupon each of the wipers 116, 124 and 125 are advanced one step and the "off-normal" contacts SC2 are closed. Contacts 1CR2 are closed because of de-energization of the coil 1CR, and the coil SC is immediately re-energized. Near the end of the stroke of the armature associated with the coil SC, the interrupter contacts SC1 are opened, again de-energizing the coil SC.

First Ball, Strike

If, at this time, none of the signal storage capacitors C3 is charged, no signal is applied to the grid of the thyratron 106, relay coil 1CR remains de-energized, contacts 1CR2 remain closed, and the coil SC automatically continues stepping under the action of its interrupter contacts SC1 until the "off-normal" contacts SC2 are opened when the wipers 116, 124 and 125 reach "home" position.

If none of the signal storage capacitors C3 is charged, the condition assumed above, this means that all of the pins are down and the bowler has obtained a strike, assuming it was a first ball which had been rolled. Thus, as the wiper 116 advances, no charges are applied to the control grid 107 and the relay coil 1CR is not re-energized. Therefore, as the wiper 125 advances in step with the wiper 116 there is no closure of contacts 1CR3 and no energization of the circuits controlling the standing pin lamps STP1 and STP10 and the lamps will not be lit to indicate standing pins since there are none.

Since the coil ST has been energized only once by closure of the contacts 1CR1, the wipers 130 and 131 have advanced only one step. Advance of the wiper 131 completes a circuit from the wire 85 through a wire 140, the wiper 131 and a wire 141 to the strike lamp ST in turn connected with a wire 142. Thus, when the wiper 124 reaches the tenth stationary contact associated therewith, a circuit is completed from the wire 85 through a wire 144, the wiper 124 and wire 145 to energize a coil LR controlling normally open contacts LR2 in wire 142. Energization of the coil LR closes contacts LR2, completing a circuit to energize the strike lamp ST. A holding circuit is maintained for the coil LR by closure of contacts LR1 so that the coil remains energized until the contacts 92, 94 are opened by lobe 89 on initiation of a succeeding pin detecting cycle.

The strike lamp ST remains energized while a new complement of pins is being set on the alley following the strike. If the system is controlled by a pinsetter, near the completion of the pinsetter cycle, say, for example, at 350° in a 360° cycle, a switch SW3 in a wire 150 is closed and maintained closed for a time slightly longer than the time required for relay ST to "home." The closing of switch SW3 causes energization of a coil RR in circuit with the switch. A holding circuit for coil RR may be provided by closure of contacts RR1. Energization of the coil RR causes closure of its normally open contacts RR2 in wire 133 to energize the coil ST. Energization of the coil ST occurs because the normally open "off-normal" contacts ST3 are closed since the wipers 130 and 131 have already advanced one step and since the normally closed interrupter contacts ST2 remain closed until the armature associated with coil ST approaches the end of its stroke. When th armature nears the end of its stroke, interrupter contacts ST2 are opened to deenergize the coil ST so that it automatically steps to the "home" position whereupon the contacts ST3 open again. As the wiper ST6 is advanced to the "home" position, the circuit to the strike lamp ST is opened and the lamp de-energized.

When the wipers 130 and 131 reach the home position, "off-normal" contacts ST4 are again closed, and a circuit is completed through these contacts, contacts RR5 and normally closed contacts BR2 to energize a coil RY, closing its contacts RY1 to complete a circuit from the wire 85, through the contacts RY1, wires 160a and 160b, wires 161a and 161b, coils 2CRA and 2CRB and wire 86 to energize each of the coils 2CR associated with the standing pin lamps STP. Energization of the coils 2CR opens contacts 2CR1, closes contacts 2CR2 to provide holding circuits for the coils 2CR, and closes contacts 2CR3 to energize each of the standing pin lamps STP. These lamp remain energized until such time as a switch SW1 is opened in wire 165 to break the holding circuit to the coils 2CR. If the system is controlled by a pinsetter, the switch SW1 may be operated by the pinsetter immediately upon initiating the following pinsetter cycle, at 20° for example, in a 360° cycle, shortly before operation of the switch SW2. If desired, in lieu of lighting all of the lamps STP by means of RY, the lamps may remain off until the next detection cycle, or in case of no strike they may be turned off at this time and remain off until the next detection cycle.

First Ball, No Strike

If the bowler does not knock down all pins with the first ball rolled, the pins left standing will result in the corresponding storage capacitors C3 being charged as previously described. Thus, when the wiper 116 of the switch SC4 contacts a stationary terminal connected to a charged capacitor such as, for example, the capacitor associated with the memory unit MU1, the charge is applied to the grid 107 of the thyratron 106, triggering the tube. The coil 1CR thus becomes energized. Contacts 1CR1 in wire 127 close, energizing the coil ST. At the same time, contacts 1CR2 in wire 120 open, stopping the automatic stepping of the coil SC. Also at this time, the contacts 1CR3 in circuit with wiper 125 close, and since the wiper 125 moves in unison with the wiper 116, a circuit is completed through contacts 1CR3, the wiper 125, and the appropriate wire 161, in this case 161a, to energize the appropriate standing pin light relay 2CR, in this case 2CRA. Energization of the coil 2CRA causes closure of the contacts 2CR2 completing a holding circuit for the coil, through the wire 165 and the switch SW1. At the same time, contacts 2CR3 are closed, but the lamp STP1 remains de-energized until such time as the contacts LR2 are closed in wire 142.

Near the end of the stroke of the armature associated with the coil ST, interrupter contacts ST1 are opened, de-energizing the coil 1CR. Thus, contacts 1CR1 are opened, de-energizing the coil ST, whereupon the wipers 130 and 131 advance a single step. Also on de-energization of the coil 1CR, the contacts 1CR2 close, allowing the coil SC to resume automatic stepping until such time as the wiper 116 encounters a stationary contact connected with a charged capacitor C3 or until the wiper 116 reaches "home" position.

When the wipers 130 and 131 advance one step as described on de-energization of the coil ST, wiper 131 completes a circuit from wire 85 through wire 140, wiper 131 and the appropriate pinfall lamp PF to the wire 142. At this time however the pinfall lamp is not energized because the contacts LR2 in wire 142 are open.

As described previously, when the wiper 124 associated with the switch SC3 reaches the tenth stationary contact, a circuit is completed through the wire 144, the wiper 124, and the wire 145 to energize the coil LR, closing the contacts LR2. This results in energization of the standing pin lights STP for which the corresponding coils 2CR have previously been energized, that is, those corresponding to standing pins. Also, a circuit is completed to energize the appropriate pinfall lamp, that is, the lamp which is at the time in circuit with wiper 131.

Ultimately, at about 350° in the pinsetter cycle, as previously described, switch SW3 is closed. However, assuming the disclosed system is used n connecton with an automatic pinsetter, provision is made in such a pinsetter for detecting the difference between a condition in which all pins have been knocked down, that is, a strike condition, and a condition in which all pins have not been knocked down with the first ball, and in case the latter condition is detected, provision is made in the pinsetter for actuating a switch SW4 in a wire 170 at about 270° in the first pinsetter cycle and holding such switch closed until about 180° in the following pinsetter cycle. Closure of the switch SW4 results in energization of a coil BR connected across the wires 121 and 122, closing contacts BR1 to provide a holding circuit for the coil. At the same time, contacts BR2 are opened and the coil RY cannot be energized. Energization of the coil BR also opens contacts BR3 in circuit with the strike lamp ST and closes contacts BR4 in circuit with the spare lamp SP, so that in the following pin detection and indication cycle a spare may be indicated by energization of the spare lamp SP in the event that all pins are knocked down with the second ball.

When the pinsetter reaches 350° the first pinsetting cycle, the switch SW3 is closed, energizing the coil RR. Contacts RR1 are closed to complete a holding circuit for the coil RR, and contacts RR2 are closed to complete a "homing" circuit for the coil ST. Contacts RR3 are opened, but the coil BR remains energized because of the closed switch SW4. Contacts RR4 in circuit with wiper 131 are opened extinguishing the pinfall lamp which has been energized. Contacts RR5 are closed, but since the contacts BR2 are open, the relay RY is not energized. Standing pin lamps STP remain energized until the switch SW1 is opened at about 20° in the succeeding pinsetter cycle.

*Second Ball, Spare*

After the second ball is rolled, the pin detecting and indication cycle follows as after the first ball. At 180° in the pinsetter cycle, the switch SW4 is opened, but the coil BR remains energized by virtue of the normally closed contacts RR3 and the now closed contacts BR1. Thus, at the end of the detection and indication cycle, if all pins have been knocked down, the wiper 131 closes the circuit through wire 141, the now closed contacts BR4 and the spare lamp SP so that when the contacts LR2 are closed the spare lamp is energized. At about 350° in the pinsetter cycle, the switch SW3 is closed, energizing the coil RR, opening the contacts RR4 and de-energizing the spare lamp SP.

At the same time, contacts RR3 are opened, de-energizing the coil BR. Also, contacts RR5 are closed, so that, the homing of wipers 130 and 131 associated with the coil ST having been completed, and the contacts ST4 closed, the coil RY is energized, closing contact RY1 and energizing each of the standing pin lamps STP.

*Second Ball, No Spare*

In the event that all pins are not knocked down with the second ball, pin detection and indication results in energization of the appropriate standing pin lamps STP and the appropriate pinfall lamp PF, and these remain energized until energization of the coil RR whereupon the pinfall lamp PF is de-energized and all standing pin lamps STP are energized in preparation for the next cycle.

I claim:
1. Means for detecting the presence of standing pins on a bowling alley, comprising, a plurality of pin detecting means positioned in a pattern corresponding to the positions of pin spots on the alley and each adapted to sense a pin standing at the spot, a pin detecting circuit including said detecting means, an electrical power supply in said circuit connected in open series circuit with said detecting means, means for momentarily closing the circuit between the power supply and said detecting means repeatedly within a predetermined period of time following the rolling of a ball on the alley to check for standing pins, and means for utilizing pulses from said detecting means when pins are standing at any of the spots.

2. Means for detecting the presence of standing pins on a bowling alley after a ball has been thrown, comprising, a plurality of separate pin detecting means positioned in a pattern corresponding to the positions of pin spots on the alley and each adapted to sense a pin standing at the spot, an electrical power supply, an electric circuit including wiring connecting each detecting means in open series circuit with the supply, means for momentarily closing the circuit between the supply and the detecting means including a scanning switch for connecting the supply to each detecting means individually in succession, means for driving the scanning switch to scan each detecting means repeatedly in a predetermined period of time following the rolling of a ball on the alley, and means for utilizing pulses from said power supply corresponding to each standing pin.

3. Means for detecting the presence of standing pins on a bowling alley in a predetermined period of time immediately following the rolling of a ball when pins may be wobbling, comprising, a plurality of pin detecting means positioned in a pattern corresponding to the positions of pin spots on the alley and each adapted to sense a pin standing at the spot, a pin detecting circuit connecting the detecting means in parallel with each other, an electrical power supply in said circuit connected in series with the detecting means including means for providing momentary high potential, low energy power pulses to the detection means individually in succession and repeatedly within said predetermined period of time following the rolling of a ball on the alley to check for standing pins, and means for utilizing the pulses when pins are standing at any of the spots.

4. The combination of claim 3 wherein the last recited means includes an indicating means for signaling the results after a ball is thrown, and a relay responsive to the pulses for energizing the indicating means.

5. The combination of claim 3, wherein said pin detecting means each comprises a switch means including a pair of electrically conductive elements embedded in the alley at each pin spot adapted to be bridged by an electrically conductive base portion of a pin standing at the spot.

6. The combination of claim 3, wherein said power supply comprises a source of power, an inductor including a primary connected in series with said source and a secondary connected in series with said detection means, a switch between the source and the primary operable to make and then break the circuit between the source and the primary, thereby to induce a power pulse in the secondary.

7. The combination of claim 6, including a capacitor wired in parallel with said switch.

8. The combination of claim 6, including a scanning switch for connecting the inductor secondary to each detecting means individually in succession, and means for driving said scanning switch and said switch between the source and the primary in timed relation to scan each detecting means repeatedly in said predetermined period of time.

9. Means for detecting the presence of standing pins on a bowling alley within a predetermined period of time after a ball has been thrown, comprising, a plurality of separate pin detecting means positioned in a pattern corresponding to the positions of pin spots on the alley and each adapted to sense a pin standing at the spot, an electrical power suply including means for providing a series of momentary power pulses, an electric circuit including wiring connecting each detecting means in open series circuit with the power supply, means for momentarily closing the circuit between the supply and the detecting means including a scanning switch for connecting the power supply to the detecting means individually in succession, means for driving the scanning switch in time with the power pulse to scan each detecting means repeatedly within said predetermined period of time following the rolling of a ball on the alley, and means for utilizing pulses from said power supply corresponding to each pin standing.

10. The combination of claim 9, wherein said pin detecting means each comprises, a switch means including a pair of electrically conductive elements embedded in the alley at each pin spot adapted to be bridged by an electrically conductive base portion of a pin standing at the spot.

11. Means for detecting the presence of standing pins on a bowling alley, comprising, a plurality of pin detecting means positioned in the alley in a pattern corresponding to the positions of pin spots on the alley and each adapted to sense a pin standing at the spot, a pin detecting circuit including said detecting means, an electrical power supply in said circuit connected in open series circuit with said detecting means, means for closing the circuit between the power supply and said detecting means to check for standing pins, separate means respectively for storing discrete signals respectively in circuit with the pin detecting means from the pin detecting means corresponding to pin spots where pins are standing, and means operable subsequent to said check for questioning said storage means to sense the stored signals.

12. The combination of claim 11, wherein the means for closing the circuit comprises a scanning switch for connecting the power supply to each detecting means individually in succession.

13. Means for detecting the presence of standing pins on a bowling alley, comprising a plurality of pin detecting means positioned in a pattern corresponding to the positions of pin spots on the alley and each adapted to sense a pin standing at the spot, a pin detecting circuit including said detecting means, an electrical power supply in said circuit connected in open series circuit with said detecting means, means for closing the circuit between the power supply and each detecting means repeatedly within a predetermined period of time following the rolling of a ball on the alley to check for standing pins, and means for storing signals from the pin detecting means at which pins are standing.

14. Means for detecting the presence of standing pins on a bowling alley, comprising, a plurality of pin detecting means positioned in the alley in a pattern corresponding to the positions of pin spots on the alley and each adapted to sense a pin stanidng at the spot, a pin detecting circuit including said detecting means, an electrical power supply in said circuit connected in open series circuit with said detecting means, means for closing the circuit between the power supply and said detecting means to check for standing pins, separate means in circuit respectively with the pin detecting means for storing discrete signals respectively from the pin detecting means at which pins are standing when the circuit is closed, and means operable subsequent to said check for scanning said storage means for sensing and utilizing the stored signals.

15. Means for detecting the presence of standing pins on a bowling alley, comprising, a plurality of pin detecting switch means positioned in a pattern corresponding to the positions of pin spots on the alley and each adapted to be closed by a pin standing at the spot, a pin detecting circuit including said switch means, an electrical power supply in said circuit connected in open series circuit with said switch means, means for momentarily closing the circuit between the power supply and said switch means to check for standing pins, separate memory circuits connected respectively with the pin detecting switch means for storing pulses from the power supply through the switch means where pins are standing when the circuit is closed, and means for subsequently questioning the memory circuits for sensing the stored pulses.

16. A system for detecting the presence of standing pins on a bowling alley after a ball has been thrown, comprising, a plurality of pin detecting switch means positioned in a pattern corresponding to the positions of pin spots on the alley and each adapted to be closed by a pin standing at the spot, a pin detecting circuit connecting the switch means in parallel with each other, an electrical power supply in said circuit connected in series with the switch means including means for providing momentary high potential low energy power pulses to the detection means individually in succession and repeatedly within a predetermined period of time following the rolling of a ball on the alley to check for standing pins, and separate memory circuits connected respectively with the switch means for storing pulses from the power supply through the switch means at which pins are standing.

17. A system for detecting the presence of standing pins on a bowling alley within a predetermined period of time after a ball has been thrown when pins may be wobbling, comprising, a plurality of separate pin detecting switch means positioned in a pattern corresponding to the positions of pin spots on the alley and each adapted to be closed by a pin standing at the spot, an electrical power supply including means for providing a series of momentary power pulses, an electric circuit including wiring connecting each switch means in open series circuit with the power supply, means for momentarily connecting the power supply to the switch means individually in succession and repeatedly within said predetermined period of time following the rolling of a ball on the alley in timed relationship with the power pulses to check for standing pins, separate memory circuits connected respectively with the pin detecting switch means responsive to pulses from the power supply through the switch means at which pins are standing for storing charges corresponding to standing pins, means for scanning the memory circuits, and means controlled by the scanning means for utilizing the charges from the memory circuits.

18. The combination of claim 17, wherein the last recited means includes an indicator for signalling pinfall results.

19. A system for detecting the presence of standing pins on a bowling alley within a predetermined period of time after a ball has been thrown when pins may be wobbling, comprising, a plurality of separate pin detecting switch means positioned in a pattern corresponding to the positions of pin spots on the alley and each adapted to be closed by a pin standing at the spot, an electrical power supply including means for providing a series of momentary power pulses, an electric circuit including wiring connecting each switch means in open series circuit with the power supply, means for momentarily connecting the power supply to the switch means individually in succession and repeatedly within said predetermined period of time following the rolling of a ball on the alley in timed relationship with the power pulses to check for standing pins, separate memory circuits connected respectively with the pin detecting switch means responsive to pulses from the power supply through the switch means at which pins are standing for storing signals corresponding to standing pins, and means for utilizing the stored signals.

20. The combination of claim 19, wherein said separate memory circuits each comprise a resistance in series with the associated switch means, a neon lamp in parallel with the resistance, and a capacitor in series with the neon lamp, so that on a pulse from the associated pin detecting switch means the neon lamp passes current charging the capacitor, whereupon the voltage across the neon lamp reduces, leaving the capacitor charged.

21. The combination of claim 20, wherein the means for utilizing the stored signals comprises, a source of power, a control relay having a coil connected in circuit with the source, a thyratron tube in circuit with the control relay including a grid controlling conductivity of the tube, and a scanning switch in circuit with the grid for connecting the latter with the memory circuits individually in succession so that each charged capacitor renders the tube conducting and the relay energized.

22. The combination of claim 21, including signal lamps for indicating the positions of pins standing, means controlled by said relay for energizing said signal lamps, signal means for indicating the number of pins down, and means controlled by said relay for energizing said signal means.

23. In a system for detecting the presence of standing pins on a bowling alley and indicating the results after a ball has been thrown, a plurality of pin detecting means positioned in a pattern corresponding to the positions of pin spots on the alley and each adapted to sense a pin standing at the spot, a pin detecting circuit including said detecting means, an electrical power supply in said circuit connected in open series circuit with said detecting means, means for momentarily closing the circuit between the power supply and said detecting means individually in succession to check for standing pins, separate memory circuits connected respectively with the pin detecting means for storing signals from the detecting means at which pins are standing, means for scanning the memory circuits, and indicating means controlled by the stored signals on operation of the scanning means for signalling pinfall results.

24. In a system for detecting the presence of standing pins on a bowling alley and indicating the results after a ball has been thrown, a plurality of pin detecting means positioned in a pattern corresponding to the positions of pin spots on the alley and each adapted to sense a pin standing at the spot, a pin detecting circuit including said detecting means, an electrical power supply in said circuit connected in open series circuit with said detecting means, means for momentarily closing the circuit between the power supply and said detecting means repeatedly within a predetermined time following the rolling of a ball on the alley to check for standing pins, separate memory circuits connected respectively with the pin detecting means for storing signals from the detecting means at which pins are standing, means for scanning the memory circuits, a control relay energizable by signals from the memory circuits on operation of the scanning means, and indicating means controlled by said relay for signalling pinfall results.

25. In a system for detecting the presence of standing pins on a bowling alley and indicating the results after a ball has been thrown, a plurality of pin detecting means positioned in a pattern corresponding to the positions of pin spots on the alley and each adapted to sense a pin standing at the spot, a pin detecting circuit including said detecting means, an electrical power supply in said circuit connected in open series circuit with said detecting means, means for momentarily closing the circuit between the power supply and said detecting means to check for standing pins, separate memory circuits connected respectively with the pin detecting means responsive to signals from the pin detecting means at which pins are standing for storing charges corresponding to standing pins, and means for utilizing the stored charges including a source of power, a control relay having a coil connected in circuit with the source, a thyratron tube in circuit with the control relay including a grid controlling conductivity of the tube, a scanning switch in circuit with the grid for connecting the latter with the memory circuits indicidually in succession so that each charged circuit renders the tube conducting and the relay energized, and indicating means controlled by said relay for signalling pinfall results.

26. In a system for detecting the presence of standing pins on a bowling alley, and indicating the resutls after a ball has been thrown, a plurality of pin detecting circuits corresponding respectively to the pin spots on the alley and each including means in the alley adapted to sense a pin standing at the spot and means to store a charge when a pin is standing, means operable subsequent to sensing for scanning the circuits to sense for stored charges, and indicating means controlled by the stored charges upon operation of the scanning means.

27. In a system for detecting the presence of standing pins on a bowling alley and indicating the results after a ball has been thrown, a plurality of pin detecting circuits corresponding respectively to the pin spots on the alley and each including means in the alley adapted to sense a pin standing at the spot and means to store a signal corresponding to the standing pin, a scanning switch operable subsequent to sensing for scanning the circuits to sense for stored charges, a control relay having a coil energizable in response to signals from the circuits corresponding to standing pins on operation of the scanning switch, and indicating means controlled by said relay for signalling pinfall results.

28. The combination of claim 27 wherein said indicating means comprises, a plurality of signal lamp circuits corresponding to the pin spots on the alley, a power supply, a distributing switch for successively connecting the power supply to the individual lamp circuits, switch contacts between the power supply and the distributing switch operable by said control relay coil, and means for operating the scanning switch and distributing switch synchronously to energize a lamp circuit corresponding to each standing pin.

29. The combination of claim 27, wherein the indicating means comprises, a plurality of signal lamps for indicating the number of pins down, a power supply, a stepping relay having an actuating coil and having switch means for successively connecting the power supply to the individual lamps, and switch contacts in circuit with said actuating coil and operable by said control relay coil for energizing the stepping relay once for each control relay energization.

30. Means for detecting the presence of standing pins on a bowling alley, comprising, a plurality of pin detecting means positioned in a pattern corresponding to the positions of pin spots on the alley and each adapted to sense a pin standing at the spot, a pin detecting circuit including said detecting means, an electrical power supply in said circuit connected in open series circuit with said detecting means, means for closing the circuit between the power supply and said detecting means to check for standing pins, separate means in circuit respectively with the pin detecting means for storing signals from the pin detecting means at which pins are standing when the circuit is closed, means for utilizing the stored signals, said separate storage means each comprising a memory circuit including a resistance in series with the associated pin detecting means, a neon lamp in parallel with the resistance, and a capacitor in series with the neon lamp, so that on a signal from the pin detecting means the neon lamp passes current, charging the capacitor, whereupon the voltage across the neon lamp reduces, leaving the capacitor charged.

References Cited in the file of this patent

UNITED STATES PATENTS 2,974,955    Walsh _____ Mar. 14, 1961